United States Patent
Tseng et al.

(10) Patent No.: US 9,152,636 B2
(45) Date of Patent: Oct. 6, 2015

(54) CONTENT PROTECTION SYSTEM IN STORAGE MEDIA AND METHOD OF THE SAME

(75) Inventors: Chien-Chung Tseng, Hsinchu (TW); Hsiang-Wen Shih, Hsinchu (TW); Wang-Ju Lee, Hsinchu (TW); Hsin-Nan Lin, Hsinchu (TW)

(73) Assignee: LEADCOM TECHNOLOGY CO., LTD., Hsin Chu (TW)

( * ) Notice: Subject to any disclaimer, the term of this patent is extended or adjusted under 35 U.S.C. 154(b) by 827 days.

(21) Appl. No.: 12/073,612

(22) Filed: Mar. 7, 2008

(65) Prior Publication Data
US 2009/0228521 A1 Sep. 10, 2009

(51) Int. Cl.
*G06F 7/00* (2006.01)
*G06F 17/30* (2006.01)

(52) U.S. Cl.
CPC .... *G06F 17/30067* (2013.01); *G06F 17/30091* (2013.01); *G06F 17/30238* (2013.01)

(58) Field of Classification Search
CPC .................. G06F 17/30091; G06F 17/30238
See application file for complete search history.

(56) References Cited

U.S. PATENT DOCUMENTS

| 5,398,285 | A | * | 3/1995 | Borgelt et al. | 380/30 |
| 5,651,064 | A | * | 7/1997 | Newell | 705/51 |
| 5,677,952 | A | * | 10/1997 | Blakley et al. | 713/189 |
| 8,060,756 | B2 | * | 11/2011 | Rao et al. | 713/190 |
| 2002/0147916 | A1 | * | 10/2002 | Strongin et al. | 713/193 |
| 2007/0016798 | A1 | * | 1/2007 | Narendra et al. | 713/189 |

* cited by examiner

*Primary Examiner* — Michael Hicks
(74) *Attorney, Agent, or Firm* — Chih Feng Yeh; Huntington Consulting Co., Ltd.

(57) ABSTRACT

The present invention discloses a content protection system in a storage medium and the method of the same. The storage medium includes a flash disk, a memory card, a hard disk, a CDR, or a MO. In one aspect of the present invention, the content protection system in a storage medium includes a database; a partitioning module coupled to the database to partition the storage medium; and a link table managing module coupled to the database to establish and manage a link table of a file to be stored in the storage medium.

13 Claims, 5 Drawing Sheets

| Pseudo-physical address of File A in visual area | physical address of File A in protected area |
|---|---|
| Pseudo-physical address of File B in visual area | physical address of File B in protected area |
| Pseudo-physical address of File C in visual area | physical address of File C in protected area |
| ⋮ | ⋮ |
| ⋮ | ⋮ |
| ⋮ | ⋮ |
| Pseudo-physical address of File N in visual area | physical address of File N in protected area |

1015b

| Logical address of File A in PC | Pseudo-physical address of File A in visual area |
|---|---|
| Logical address of File B in PC | Pseudo-physical address of File B in visual area |
| Logical address of File C in PC | Pseudo-physical address of File C in visual area |
| ⋮ | ⋮ |
| ⋮ | ⋮ |
| ⋮ | ⋮ |
| Logical address of File N in PC | Pseudo-physical address of File N in visual area |

CONTENT PROTECTION SYSTEM IN STORAGE MEDIA AND METHOD OF THE SAME

FIELD OF THE INVENTION

The present invention relates to content protection, and more particularly to a content protection system in storage media and the method of the same.

BACKGROUND OF THE INVENTION

Recently, storage media have been widely developed while the consumer electronics products have become popular. The storage capacities of the storage media keep increasing and the sizes of the storage media keep minimizing. People prefer to use storage media to store audio file, video file, text file, or image file to share with others or to use by themselves. Such digital files in storage media are easily deleted or formatted by the user unconsciously, and may be copied by others who get the storage media unauthorizedly. Therefore, a content protection system has been developed in recent years. A conventional content protection system usually can protect the file stored in a storage medium from being deleted unconsciously.

For example, in a conventional USB storage device, the storage area is divided into an area in which execution of reading, writing and deleting is allowed and an area in which only execution of reading is allowed. Information to make a USB mass storage class driver recognize these areas as areas corresponding, respectively, to logical unit numbers defined in the SCSI command set of the USB mass storage class driver owned by the host is stored in the USB storage device. The information includes logical unit numbers, formats, writing/deleting allowed/not allowed flag, logical block numbers and physical block numbers. By this, the USB mass storage class driver recognizes the USB storage device as a SCSI device having two logical units.

The conventional USB storage device as aforementioned can prevent files in a read-only area from being deleted. However, such USB storage device cannot prevent files from being hacked or mass copied by a hacker or an illegal user unauthorizedly because the two logical units in the conventional USB storage device are still visual. Therefore, there is still a demand for providing a content protection system which can protect files in storage media from being hacked or mass copied.

SUMMARY OF THE INVENTION

In view of the aforementioned defects of the conventional USB storage device, the present invention discloses a content protection system in a storage medium.

The present invention discloses a content protection system in a storage medium and the method of the same. The storage medium includes a flash disk, a memory card, a hard disk, a CDR, or a MO. In one aspect of the present invention, the content protection system in a storage medium includes a database; a partitioning module coupled to the database to partition the storage medium; and a link table managing module coupled to the database to establish and manage a link table of a file to be stored in the storage medium. The content protection system in the storage medium further includes an autorecovering module coupled to the database. Moreover, the storage medium includes a visual area and a protected area partitioned by the partitioning module to store the file and prevent the file from being formatted through the link table. The link table includes a pseudo-physical address of the file in the visual area, a physical address of the file in the protected area, and a logical address of the file in a user's data processing device. The data processing device includes a personal computer, a notebook, a personal digital assistant, or any other types of data processing devices.

In another aspect of the present invention, the content protection system in a storage medium includes a database; a partitioning module coupled to the database to partition the storage medium; and a hybrid password generating module coupled to the database to generate a hybrid password from a user input password and a hardware ID number of the storage medium. The content protection system in the storage medium further includes an encryption module coupled to the database to encrypt the file with the hybrid password and a decryption module coupled to the database to decrypt the file with the hybrid password. The content protection system in the storage medium further includes an autorecovering module coupled to the database. Moreover, the storage medium includes a visual area and a protected area partitioned by the partitioning module.

In still another aspect of the present invention, the method for protecting contents in a storage medium includes preparing a storage medium; partitioning the storage medium into a visual area and a protected area; storing a file into the protected area; and establishing a link table of the file. The method further includes a step of fetching the file by the link table. The link table includes a logical address of the file in a user's data processing device, a pseudo-physical address of the file in the visual area, and a physical address of the file in the protected area. The method further includes a step of copying the pseudo-physical address of the file from the link table to the visual area when the visual area is formatted or the pseudo-physical address of the file is deleted. The data processing device includes a personal computer, a notebook, a personal digital assistant, or any other types of data processing devices.

In yet another aspect of the present invention, the method for protecting contents in a storage medium includes preparing a storage medium; partitioning the storage medium into a visual area and a protected area; generating a first hybrid password from a user input password and a hardware ID number of the storage medium; encrypting a file to be stored with the first hybrid password; and storing the encrypted file into the protected area. The method for protecting contents in a storage medium further includes generating a second hybrid password from another user input password and the hardware ID number of the storage medium; accessing the encrypted file if the first hybrid password and the second hybrid password are identical; and decrypting the encrypted file with the second hybrid password.

One advantage of the present invention is that the content protection system can prevent digital contents stored in the storage medium from unauthorized access, computer hacking, mass clone on purpose, and unconscious data corruption by the legal user.

Another advantage of the present invention is that the content protection system can provide the safety of transferring digital contents and an autorecovery and antiformat mechanism for the digital contents.

Still another advantage of the present invention is that the content protection system can provide a hyper link mechanism which prevents the physical address of the file from being hacked or known by a hacker or an illegal user.

Yet another advantage of the present invention is that content protection system is compatible to different operating systems.

Still another advantage of the present invention is that content protection system is independent of hardware and suitable for any kinds of mass storage device.

These and other advantages will become apparent from the following description of preferred embodiments taken together with the accompanying drawings and the appended claims.

BRIEF DESCRIPTION OF THE DRAWINGS

The present invention may be understood by some preferred embodiments and detailed descriptions in the specification and the attached drawings below. The identical reference numbers in the drawings refer to the same components in the present invention. However, it should be appreciated that all the preferred embodiments of the invention are only for illustrating but not for limiting the scope of the claims and wherein:

FIG. 3 illustrates an example of the link tables established by the link table managing module according to the present invention;

DETAILED DESCRIPTION OF THE PREFERRED EMBODIMENT

The invention will now be described with the preferred embodiments and aspects and these descriptions interpret structure and procedures of the invention only for illustrating but not for limiting the Claims of the invention. Therefore, except the preferred embodiments in the specification, the present invention may also be widely used in other embodiments.

Figure 1:
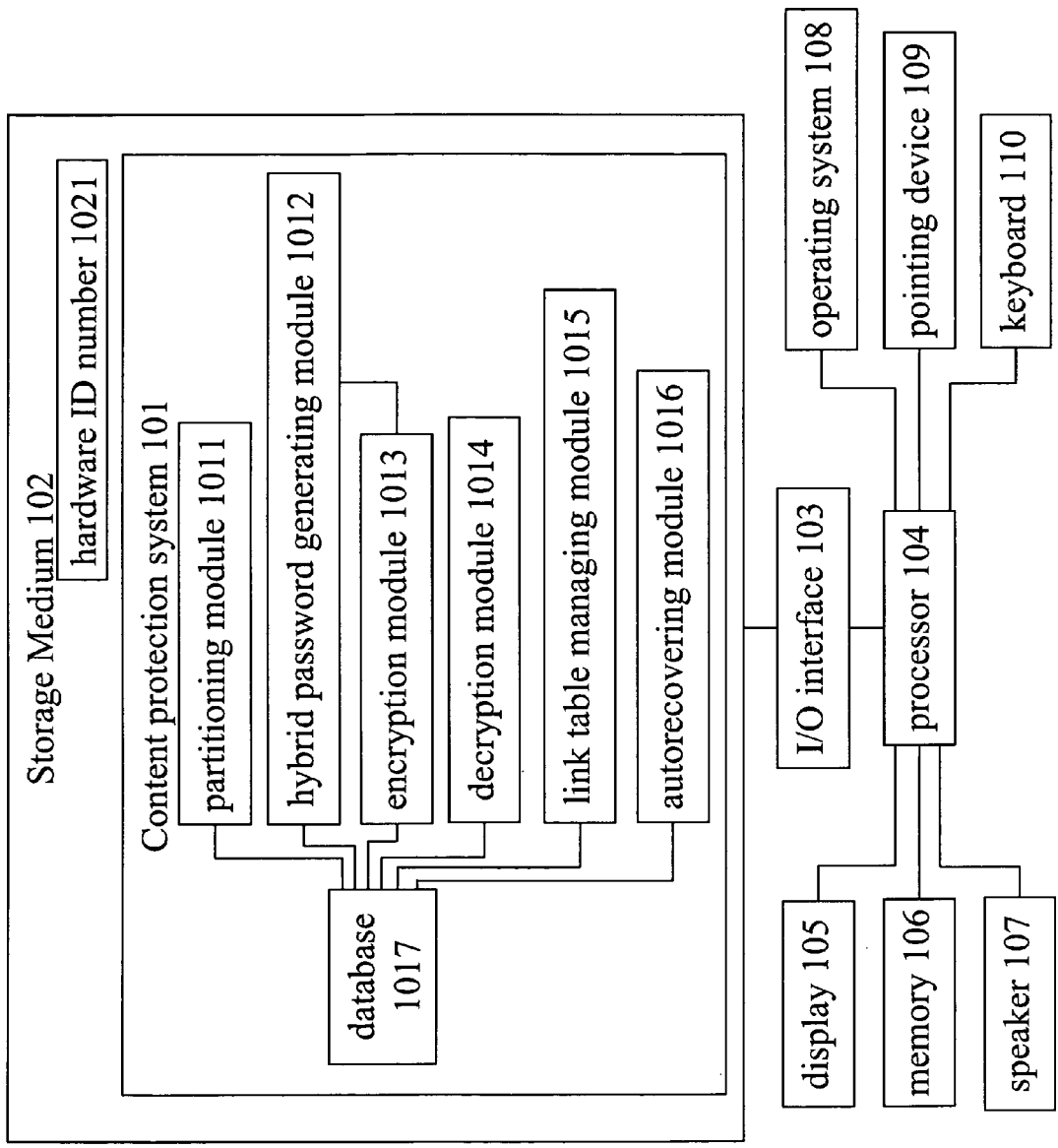
FIG. 1 is a block diagram of the content protection system in the storage medium according to the present invention.

The present invention provides a content protection system in a storage medium to protect digital contents stored in the storage medium. In one embodiment, the storage medium may be a flash disk, a memory card, a hard disk, a CDR (Compact Disk Recordable), a MO (Magneto Optical Disc), or any other types of storage media. The digital contents may be audio files, video files, text files, and image files. It should be noted that some of the elements in the following embodiment may be optional. For example, the hybrid password generating module 1012 and the link table managing module 1015 may be employed together or separately. With reference to FIG. 1, in the preferred embodiment of the present invention, the content protection system 101 in storage medium 102 includes a partitioning module 1011, a hybrid password generating module 1012, an encryption module 1013, a decryption module 1014, a link table managing module 1015, an autorecovering module 1016, and a database 1017. The database 1017 is coupled to the partitioning module 1011, the hybrid password generating module 1012, the encryption module 1013, the decryption module 1014, the link table managing module 1015, and the autorecovering module 1016 respectively. The storage medium 102 may be coupled to a data processing device, for example, a personal computer as shown in FIG. 1 for purpose of illustrating only. In one embodiment, the storage medium 102 may be a personal computer, a notebook, a personal digital assistant, or any other types of data processing devices. A hardware ID number 1021 is stored in the storage medium 102 as shown in FIG. 1. Typically, the personal computer includes an I/O interface 103, a processor 104, a display 105, a memory 106, a speaker 107, an operating system 108, a pointing device 109, and a keyboard 110. Because the features and the functions of these elements are well-known in the art, the detailed description is omitted.

Figure 2:
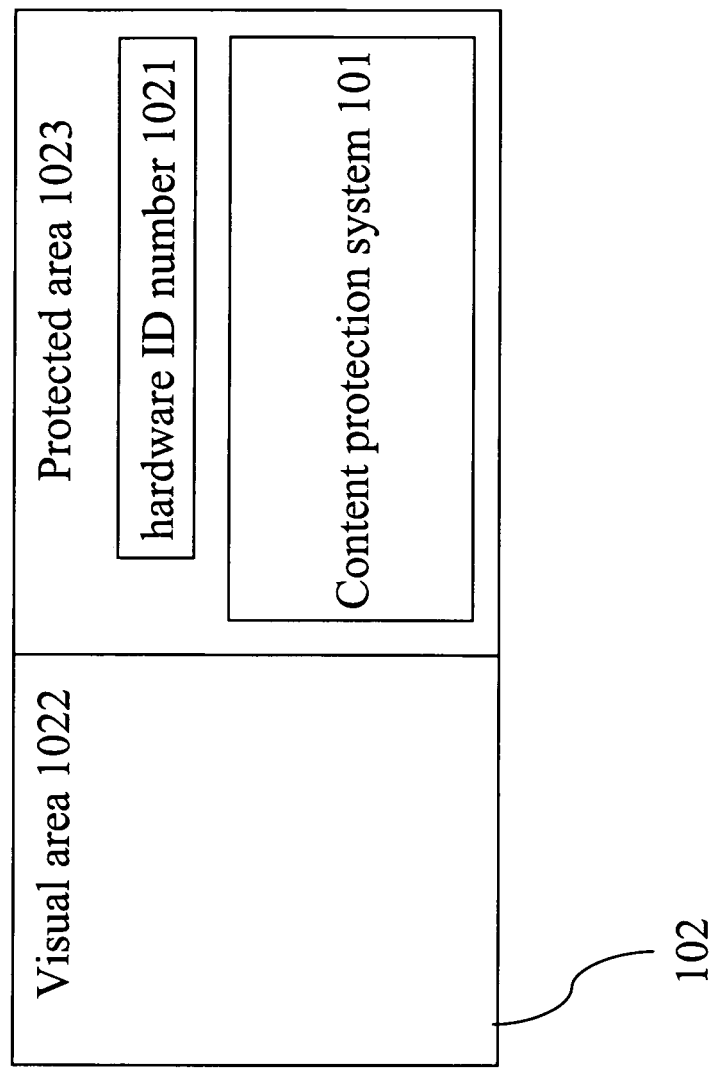
FIG. 2 is a block diagram of the storage medium according to the present invention, illustrating an example of partitions of the storage medium.

The partitioning module 1011 is utilized to partition the storage medium 102 into two or more areas. One of the two or more areas may be a hidden area employed as a protected area. The other areas of the two or more areas may be visual areas. In one embodiment, the storage medium 102 is partitioned by the partitioning module 1011 into two areas, a visual area 1022 and a protected area 1023, as shown in FIG. 2. After the storage medium 102 is partitioned by the partitioning module 1011 into two areas, for example a visual area 1022 and a protected area 1023, the content protection system 101 and the hardware ID number 1021 may be stored in the protected area 1023 as shown in FIG. 2. The hybrid password generating module 1012 is utilized to generate a hybrid password from a user input password and the hardware ID number 1021 of the storage medium 102 by a password algorithm such as AES (Advanced Encryption Standard), SHA (Secure Hash Standard), RSA, or any other types of password algorithms. The user input password is input by the user when the user stores a file to be protected into the protected area 1023 of the storage medium 102. The encryption module 1013 is utilized to encrypt the file to be protected with the hybrid password. The decryption module 1014 is utilized to decrypt the encrypted file with the hybrid password.

One aspect of the present invention is that the present invention includes the link table managing module 1015 which is utilized to establish link tables of the file to be protected and manage the link tables dynamically after the file is encrypted and stored into the protected area 1023, so as to perform a hyper link mechanism. The database 1017 is utilized to store the partition data provided by the partitioning module 1011, the hybrid passwords provided by the hybrid password generating module 1012, and the link tables provided by the link table managing module 1015. Therefore, the encryption module 1013 and the decryption module 1014 can search hybrid passwords in the database 1017 to encrypt and decrypt the file. The autorecovering module 1016 is utilized to recover the hyper link mechanism automatically when the visual area 1022 is formatted or data therein are deleted by the user unconsciously.

In one example, when the user couples the storage medium 102 with the data processing device, for example, the personal computer (PC) through the I/O interface 103, the partitioning module 1011 of the content protection system 101 sends a message to the PC and the message is displayed on the display 105, so as to inquire the user a number of partitions. After the user inputs the number of partitions, for example, two by the keyboard 110, the partitioning module 1011 partitions the storage medium 102 into the visual area 1022 and the protected area 1023, as shown in FIG. 2. In one example, the content protection system 101 and the hardware ID number 1021 are typically stored into the protected area 1023. In one case, when the user stores a file into the storage medium 102, the hybrid password generating module 1012 sends a message to the PC and inquires the user to enter a password for the file to be stored. If the user takes no action, the file may be treated as a regular file and stored into the visual area. On the contrary, in order to prevent the usage without authority, the file should be encrypted. A hybrid password will be generated for file encryption and decryption by the combination of the hardware ID (identification) number and the password input by the user through password algorithms. The hardware ID number may be a serial number of a device, a product code, and so on. Therefore, the encrypted file may be accessed with the hybrid password generated by the combination of the user input password and the hardware ID number. The security of files will be better than prior arts because the hardware ID number is unique. Therefore, even if the storage medium is moved to other places, the file can not be decoded without the original hardware ID number.

In one embodiment, the hybrid password generating module 1012 may output or generate a hybrid password combined by the hardware ID number 1021 and the password input by the user as a first hybrid password. The encryption module 1013 may encrypt the file. To phrase in another words, if the user enters a predetermined password as the user input password, the hybrid password generating module 1012 may generate the first hybrid password from the user input password and the hardware ID number 1021 by a password algorithm such as AES (Advanced Encryption Standard), SHA (Secure Hash Standard), RSA, or any other types of password algorithms, so as to output the first hybrid password for the database 1017 and the encryption module 1013. Alternatively, the hybrid password may be generated by the hardware ID number alone.

Subsequently, the encryption module 1013 may encrypt the file with the first hybrid password. After the file is encrypted, the encrypted file is stored into the protected area 1023, and a pseudo-physical address of the encrypted file is generated in the visual area 1022 while a physical address of the encrypted file is generated in the protected area 1023. At the meanwhile, the link table managing module 1015 establishes link tables of the file, which include for example a first link table 1015a with the logical address of the encrypted file in the PC and the pseudo-physical address of the encrypted file in the visual area 1022, and a second link table 1015b with the pseudo-physical address of the encrypted file in the visual area 1022 and the physical address of the encrypted file in the protected area 1023 as shown in FIG. 3, and afterwards, the link table managing module 1015 creates the link tables to the database 1017. When the file is deleted or the storage medium 102 is defragged by the user consciously, the link table managing module 1015 can maintain and manage the link tables in the database 1017 dynamically.

Figure 4:
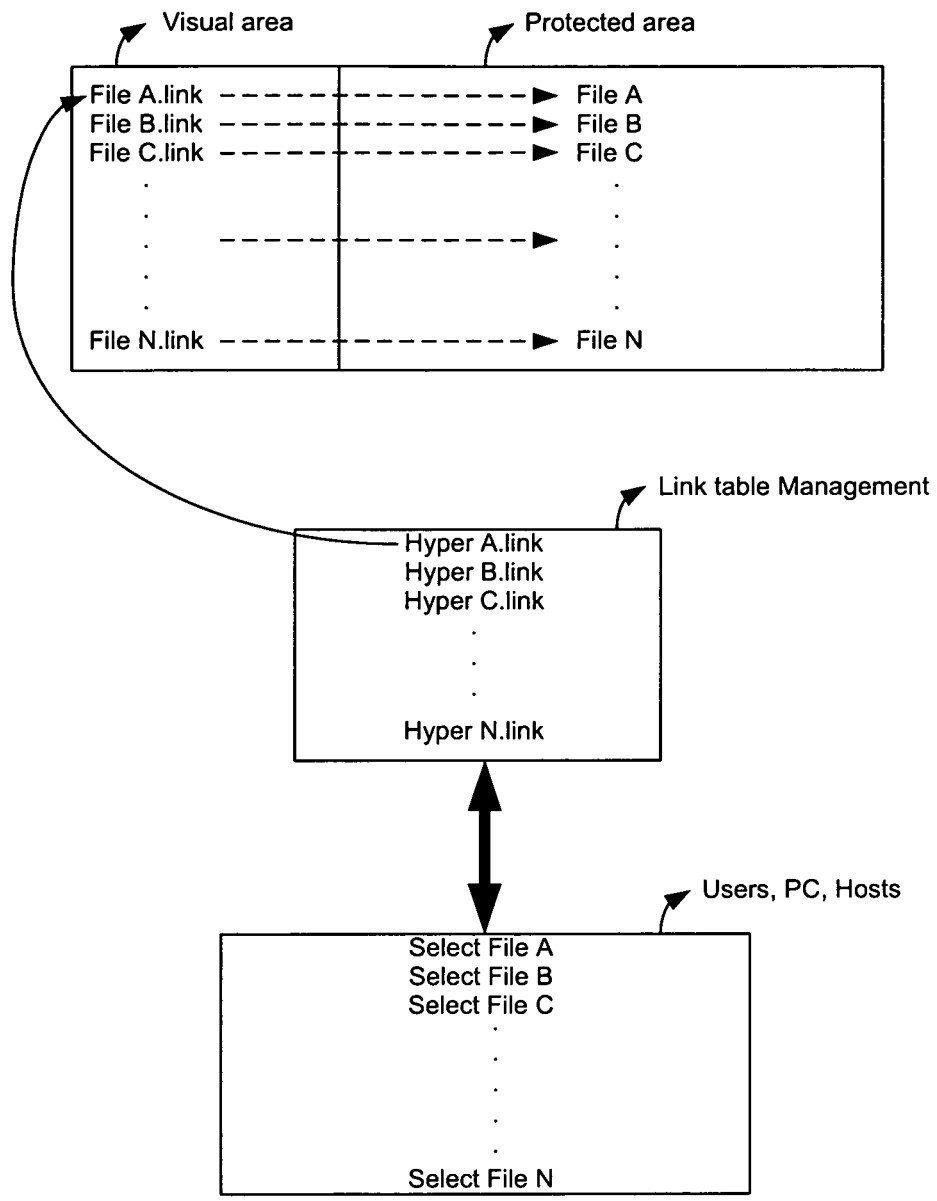
FIG. 4 illustrates the hyper link mechanism implemented by the link table managing module according to the present invention.

With reference to FIG. 4, it indicates when the user would like to access such as read, delete, transfer, or copy the file, after he/she utilizes the pointing device 109 of the PC to select the desired file, the hybrid password generating module 1012 may send a message to the PC to be displayed on the display 105, so as to ask the user to enter a correct password for access to the file. After the password is entered by the user, the hybrid password generating module 1012 may generate a second hybrid password from the password entered by the user and the hardware ID number 1021 of the device, for instance, the PC serial number or other hardware by the aforementioned password algorithm. If the second hybrid password is identical to the aforementioned first hybrid password stored in the database 1017, the link table managing module 1015 may utilize the link table stored in the database 1017 to link the command generated by the PC from the logical address in the PC to the pseudo-physical address in the visual area 1022, and then from the pseudo-physical address in the visual area 1022 to the physical address in the protected area 1023 so as to access the file. Subsequently, the decryption module 1014 may decrypt the file with the second hybrid password or the first hybrid password, such that the decrypted file can be read, deleted, moved, or copied by the user. If the second hybrid password is different from the first hybrid password, an error message may be sent to the PC and the operation is stopped or terminated and the access is denied. It indicates that the access is lack of authority. These operations are processed transparently.

Furthermore, when the pseudo-physical address of the file in the visual area 1022 is deleted or the visual area 1022 of the storage medium 102 is formatted by the user unconsciously, the autorecovering module 1016 may copy the pseudo-physical address of the file in the link tables stored in the database 1017 back to the visual area 1022 automatically, so as to autorecover the hyper link mechanism. Moreover, the true (actual) file in the protected area 1023, and the link tables, the hybrid passwords and the partition data in the database 1017 will be prevented from being formatted or deleted unconsciously by the authorized (legal) user because the protected area 1023 is hidden from the user and the true file in the protected area 1023 can only be accessed through the link tables, such that anti-format can also be achieved. Further, the hardware ID number is unique for any kinds of storage media, such as a flash disk, a memory card, a hard disk, a CDR, or a MO. Therefore, the hybrid password generated from the user input password and the hardware ID number can prevent the file stored in the protected area 1023 from being hacked by a hacker because the hacker is unlikely to know the hardware ID number unless he/she owns the specific hardware and know the hardware ID number of the device. The physical address of the true file will not be hacked or known by a hacker or a unauthorized (illegal) user because the link tables of the true file are stored in the database 1017 of the content protection system 101 in the protected area 1023 and the pseudo-physical address of the file in the visual area 1022 will not indicate the physical address of the file. The security of the present invention is higher than any conventional means.

Therefore, the present invention provides the content protection system in the storage medium which can prevent digital contents stored in the storage medium from unauthorized access, computer hacking, mass clone on purpose, and unconscious data corruption by the legal user, and can provide the safety of transferring digital contents and an autorecovery and anti-format mechanism for the digital contents. Furthermore, the content protection system in the storage medium of the present invention is compatible to different operating systems, independent of hardware, and suitable for any kinds of mass storage device.

Figure 5:
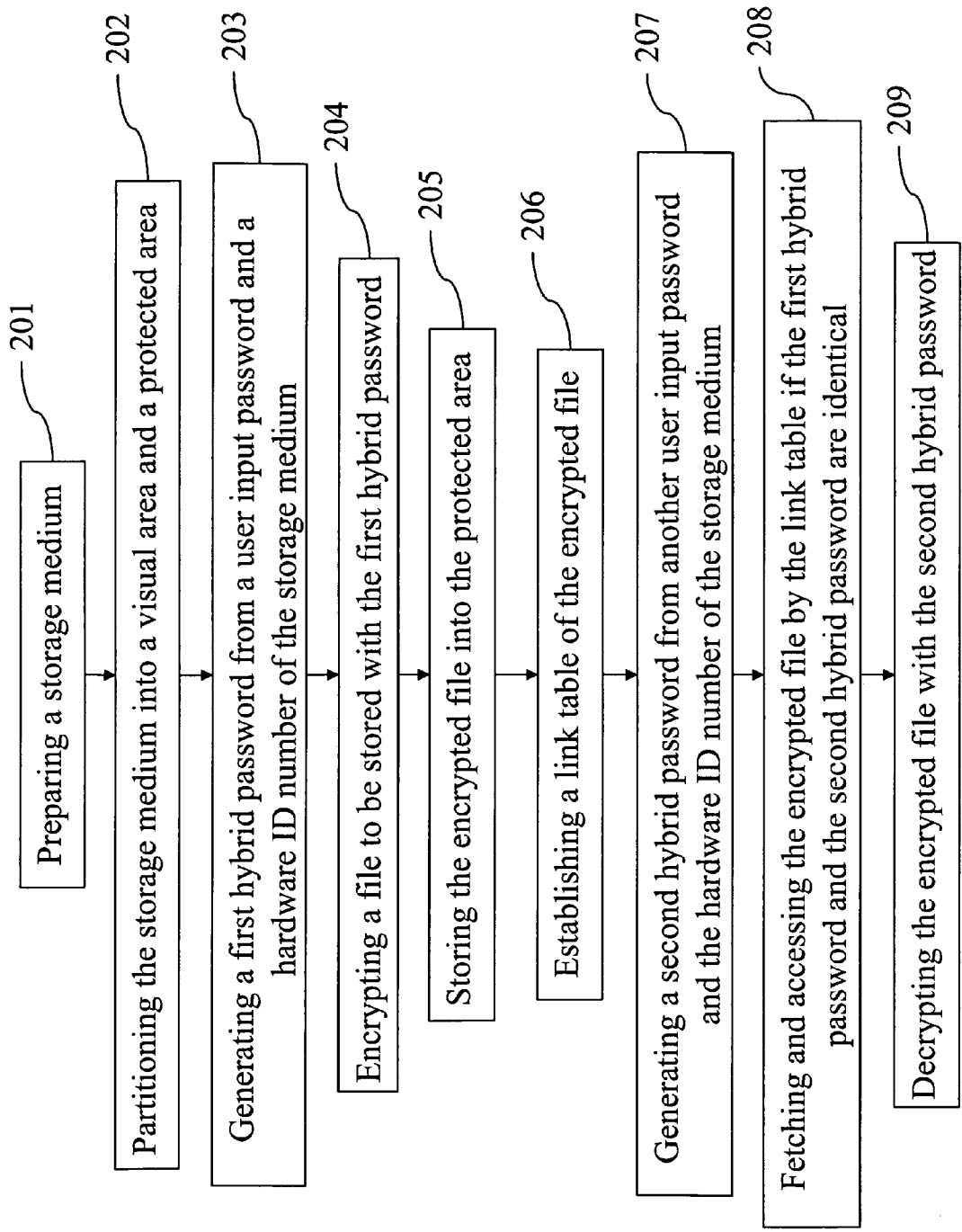
FIG. 5 is a process diagram of the method for protecting contents in a storage medium according to the present invention.

With reference to FIG. 5, in one embodiment of the present invention, the method for protecting contents in a storage medium includes preparing a storage medium firstly in step 201. Then, in step 202, the storage medium is partitioned into a visual area and a protected area. Subsequently, in step 203, a first hybrid password is generated from a user input password and a hardware ID number of any hardware, followed by encrypting a file to be stored with the first hybrid password in step 204 and, in step 205, the encrypted file is stored into the protected area. Subsequently, in step 206, a link table of the encrypted file is established. When the user accesses the desired file, in step 207 a second hybrid password is generated from another user input password and the hardware ID number of the hardware. Please refer to step 208. The encrypted file is fetched by the link table if the first hybrid password and the second hybrid password are identical. Finally, in step 209, decrypt the encrypted file with the second (first) hybrid password. Otherwise, the access is denied. The method further includes a step of copying the pseudo-physical address of the file from the link table to the visual area when the visual area is formatted or the pseudo-physical address of the file is deleted.

The foregoing description is a preferred embodiment of the present invention. It should be appreciated that this embodiment is described for purposes of illustration only, not for limiting, and that numerous alterations and modifications may be practiced by those skilled in the art without departing from the spirit and scope of the invention. It is intended that all such modifications and alterations are included insofar as they come within the scope of the invention as claimed or the equivalents thereof.

What is claimed is:

1. A computer-readable storage medium storing a program for protecting contents of the computer-readable storage medium, the program comprising:
    a database;
    a partitioning module coupled to the database for partitioning a space of the storage medium into a plurality of areas which include at least one visual area and at least one protected area, wherein the at least one protected area is hidden from a user;
    a link table managing module coupled to the database to establish and manage a link table of an encrypted file stored in one of the at least one protected area;
    a pseudo-physical address of the encrypted file generated in the at least one visual area while a physical address of the encrypted file is generated in the at least one protected area;
    a hybrid password generating module coupled to the database to generate a hybrid password by combination of a user input password and a hardware ID number of the storage medium through password algorithms, wherein the hardware ID number of the storage medium is unique;
    an encryption module coupled to the database to encrypt the encrypted file with the hybrid password;
    wherein the link table includes a link of the pseudo-physical address of the encrypted file in one of the at least one visual area, a logical address of the encrypted file in a user's data processing device and the physical address of the encrypted file in one of the at least one protected area; and
    wherein the link table, the hybrid password and the hardware ID number of the storage medium are stored in one of the at least one protected area.

2. The computer-readable storage medium of claim 1, further comprising an auto-recovering module coupled to the database for auto-copying the pseudo-physical address of the encrypted file into the visual area from the link table when the visual area is formatted or the pseudo-physical address of the encrypted file is deleted from the visual area.

3. The computer-readable storage medium of claim 1, wherein the user's data processing device comprises a personal computer, a notebook, or a personal digital assistant.

4. The computer-readable storage medium of claim 1, further comprising a decryption module coupled to the database.

5. The computer-readable storage medium of claim 1, wherein the database stores partition data provided by the partitioning module, the hybrid password provided by the hybrid password generating module, and the link table provided by the link table managing module.

6. A method for protecting contents of a computer-readable storage medium, comprising:
    preparing a storage medium with a database, and a partitioning module, a link table managing module and an auto-recovering module which are coupled to the database respectively;
    partitioning a space of the storage medium into a plurality of areas which include at least one visual area and at least one protected area by the partitioning module of the storage medium, wherein the at least one protected area is hidden from a user;
    storing an encrypted file encrypted with a first hybrid password into one of the at least one protected area, wherein the first hybrid password is generated by combination of a user input password and a hardware ID number of the storage medium through password algorithms, wherein the hardware ID number of the storage medium is unique;
    generating a pseudo-physical address of the encrypted file in the at least one visual area while a physical address of the encrypted file is generated in the at least one protected area;
    establishing a link table of the encrypted file by the link table managing module of the storage medium;
    wherein the link table includes a link of the pseudo-physical address of the encrypted file in one of the at least one visual area, a logical address of the encrypted file in a user's data processing device and the physical address of the encrypted file in one of the at least one protected area; and
    wherein the link table, the first hybrid password and the hardware ID number of the storage medium are stored in one of the at least one protected area.

7. The method of claim 6, wherein the storage medium comprises a flash disk, a memory card, a hard disk, a CDR or a MO.

8. The method of claim 6, wherein the user's data processing device comprises a personal computer, a notebook, or a personal digital assistant.

9. The method of claim 6, further comprising a step of auto-copying the pseudo-physical address of the encrypted file into the visual area from the link table by the auto-recovering module when the visual area is formatted or the pseudo-physical address of the encrypted file is deleted from the visual area.

10. A computer-readable storage medium storing a program for causing a computer to protect contents of the computer, said program causing the computer to perform a process comprising:
    partitioning a space of a storage medium into a plurality of areas which include at least one visual area and at least one protected area by a partitioning module of the storage medium, wherein the at least one protected area is hidden from a user;
    generating a first hybrid password by combination of a user input password and a hardware ID number of the storage medium through password algorithms by a hybrid password generating module of the storage medium, wherein the hardware ID number of the storage medium is unique;
    encrypting an encrypted file with the first hybrid password by an encryption module of the storage medium;
    storing the encrypted file into one of the at least one protected area;

generating a pseudo-physical address of the encrypted file in the at least one visual area while a physical address of the encrypted file is generated in the at least one protected area;

establishing a link table of the encrypted file by a link table managing module of the storage medium;

wherein the link table includes a link of the pseudo-physical address of the encrypted file in one of the at least one visual area, a logical address of the encrypted file in a user's data processing device and the physical address of the encrypted file in one of the at least one protected area; and wherein the link table, the first hybrid password and the hardware ID number of the storage medium are stored in one of the at least one protected area.

11. The computer-readable storage medium of claim 10, wherein the storage medium comprises a flash disk, a memory card, a hard disk, a CDR or a MO.

12. The computer-readable storage medium of claim 11, wherein the process further comprises a step of auto-copying the pseudo-physical address of the encrypted file into the visual area from the link table by an auto-recovering module when the visual area is formatted or the pseudo-physical address of the encrypted file is deleted from the visual area.

13. The computer-readable storage medium of claim 10, wherein the user's data processing device comprises a personal computer, a notebook, or a personal digital assistant.

* * * * *